(12) United States Patent
Routray et al.

(10) Patent No.: US 11,475,335 B2
(45) Date of Patent: Oct. 18, 2022

(54) COGNITIVE DATA PREPARATION FOR DEEP LEARNING MODEL TRAINING

(71) Applicant: International Business Machines Corporation, Armonk, NY (US)

(72) Inventors: Ramani Routray, San Jose, CA (US); Sheng Hua Bao, San Jose, CA (US); Claire Abu-Assal, Pismo Beach, CA (US); Cartic Ramakrishnan, San Jose, CA (US); Pathirage Dinindu Sujan Udayanga Perera, San Jose, CA (US); Abhinandan Kelgere Ramesh, San Jose, CA (US); Bruce L. Hillsberg, San Carlos, CA (US)

(73) Assignee: International Business Machines Corporation, Armonk, NY (US)

( * ) Notice: Subject to any disclaimer, the term of this patent is extended or adjusted under 35 U.S.C. 154(b) by 847 days.

(21) Appl. No.: 16/393,219

(22) Filed: Apr. 24, 2019

(65) Prior Publication Data

US 2020/0342339 A1 Oct. 29, 2020

(51) Int. Cl.
*G06N 5/04* (2006.01)
*G06N 20/00* (2019.01)

(52) U.S. Cl.
CPC .............. *G06N 5/043* (2013.01); *G06N 20/00* (2019.01)

(58) Field of Classification Search
None
See application file for complete search history.

(56) References Cited

U.S. PATENT DOCUMENTS 9,460,400 B2 10/2016 De Bruin et al.
9,916,538 B2 3/2018 Zadeh et al.

FOREIGN PATENT DOCUMENTS

CN 107273387 A 10/2017
WO WO2017/027373 A1 2/2017

OTHER PUBLICATIONS

Ertekin S, Huang J, Bottou L, Giles L. Learning on the border: active learning in imbalanced data classification. InProceedings of the sixteenth ACM conference on Conference on information and knowledge management Nov. 6, 2007 (pp. 127-136). (Year: 2007).*

(Continued)

*Primary Examiner* — Vincent Gonzales
(74) *Attorney, Agent, or Firm* — Stephen J. Walder, Jr.; Aaron Ponticos (57) ABSTRACT

A mechanism is provided in a data processing system for training a computer implemented model. The mechanism determines an operation for which the computer implemented model is to be trained. The mechanism performs a statistical analysis of an enterprise dataset for an enterprise to generate one or more statistical distributions of cases and features correlated with the operation for which the computer implemented model is to be trained. The mechanism selects a subset of cases in the enterprise dataset for annotation based on the one or more statistical distributions of cases and features. The mechanism annotates the selected subset of cases to generate an annotated training dataset. The mechanism trains the computer implemented model, using the annotated training dataset, to perform the operation.

19 Claims, 3 Drawing Sheets

(56) References Cited

OTHER PUBLICATIONS

Escalante HJ, Guyon I, Escalera S, Jacques J, Madadi M, Baró X, Ayache S, Viegas E, GiigluturkGüçlütürk Y, Güçlü U, Van Gerven MA. Design of an explainable machine learning challenge for video interviews. In 2017 International Joint Conference on Neural Networks (IJCNN) May 14, 2017 (pp. 3688-3695). IEEE. (Year: 2017).*
Fersini E, Messina E, Toscani D, Archetti F, Cislaghi M. Semantics and Machine Learning for Building the Next Generation of Judicial Court Management Systems. InKMIS 2010, pp. 51-60. (Year: 2010).*
Vaughan JW. Making Better Use of the Crowd: How Crowdsourcing Can Advance Machine Learning Research. J. Mach. Learn. Res.. Jan. 1, 2017;18(1):7026-71. (Year: 2017).*
Chairi I, Alaoui S, Lyhyaoui A. Sample selection based active learning for imbalanced data. In 2014 Tenth International Conference on Signal-Image Technology and Internet-Based Systems Nov. 23, 2014 (pp. 645-651). IEEE. (Year: 2014).*
Batista, Gustavo et al., "A Study of the Behavior of Several Methods for Balancing Machine Learning Training Data", ACM SIGKDD Explorations Newsletter 6.1, Jun. 2004, 10 pages.
Han, Hui et al., "Borderline—SMOTE: A New Over-Sampling Method in Imbalanced Data Sets Learning", International Conference on Intelligent Computing, Springer, Berlin, Heidelberg, Aug. 23-26, 2005, 10 pages.

* cited by examiner

COGNITIVE DATA PREPARATION FOR DEEP LEARNING MODEL TRAINING

BACKGROUND

The present application relates generally to an improved data processing apparatus and method and more specifically to mechanisms for cognitive data preparation for deep learning model training.

Deep learning, also known as deep structured learning or hierarchical learning, is part of a broader family of machine learning methods based on learning data representations, as opposed to task-specific algorithms. Learning can be supervised, semi-supervised or unsupervised. Deep learning architectures, such as deep neural networks, deep belief networks, and recurrent neural networks, have been applied to fields including computer vision, speech recognition, natural language processing, audio recognition, social network filtering, machine translation, bioinformatics, drug design, medical image analysis, material inspection and board game programs, where they have produced results comparable to and in some cases superior to human experts.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system, for training a computer implemented model. The method comprises determining, by the data processing system, an operation for which the computer implemented model is to be trained. The method further comprises performing, by the data processing system, a statistical analysis of an enterprise dataset for an enterprise to generate one or more statistical distributions of cases and features correlated with the operation for which the computer implemented model is to be trained. The method further comprises selecting, by the data processing system, a subset of cases in the enterprise dataset for annotation based on the one or more statistical distributions of cases and features. The method further comprises annotating, by the data processing system, the selected subset of cases to generate an annotated training dataset. The method further comprises training, by the data processing system, the computer implemented model, using the annotated training dataset, to perform the operation.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Clients have existing data sets for an enterprise that may be provided in both machine readable and unreadable documents, audio, video, and corresponding metadata. When the enterprise wishes to implement cognitive system capabilities, it is a largely manual process to identify the enterprise data to use for training and testing of a cognitive system solution for use with the enterprise. Integrating all of the enterprise's existing data for training and testing is often unworkable, because it may require a large investment of human resources to annotate the data for use with the cognitive system.

The illustrative embodiments provide a data preparation engine that performs a statistical analysis of the existing data set for an enterprise to generate one or more statistical distributions of the cases and features correlated with an operation for which a cognitive system is to be trained. The particular features looked for may be subject matter expert (SME) supplied or may be learned through machine learning. The data preparation engine performs a diversity based analysis of the statistical distribution to select a subset of entries in the data set, e.g., cases that have features that would represent all possible combinations of the features in correlation with the desired determination. This subset of entries are then identified for annotation and used as a training data set for the cognitive system. The annotation may be performed via a template population based approach with corresponding annotation metadata.

The illustrative embodiments address the problem that existing enterprise data sets are often difficult to utilize for training and testing a cognitive system and are not generally set up for cognitive system utilization. The illustrative embodiments provide a mechanism for reducing the amount of enterprise data that must be annotated to enable accurate training and testing of a cognitive system. The illustrative embodiments also provide a mechanism for automatically annotating enterprise data sets for use with cognitive system training/testing.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
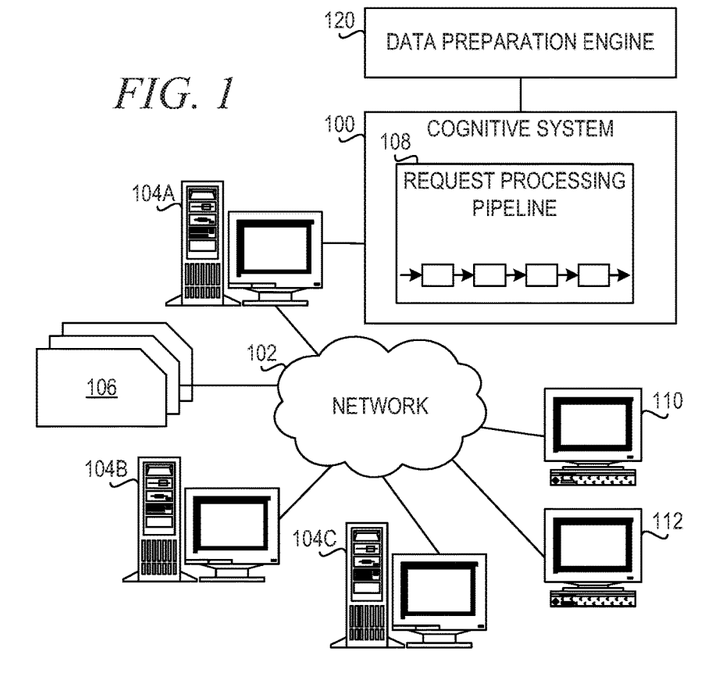
FIG. 1 is an example diagram of a distributed data processing system in which aspects of the illustrative embodiments may be implemented.
Figure 2:
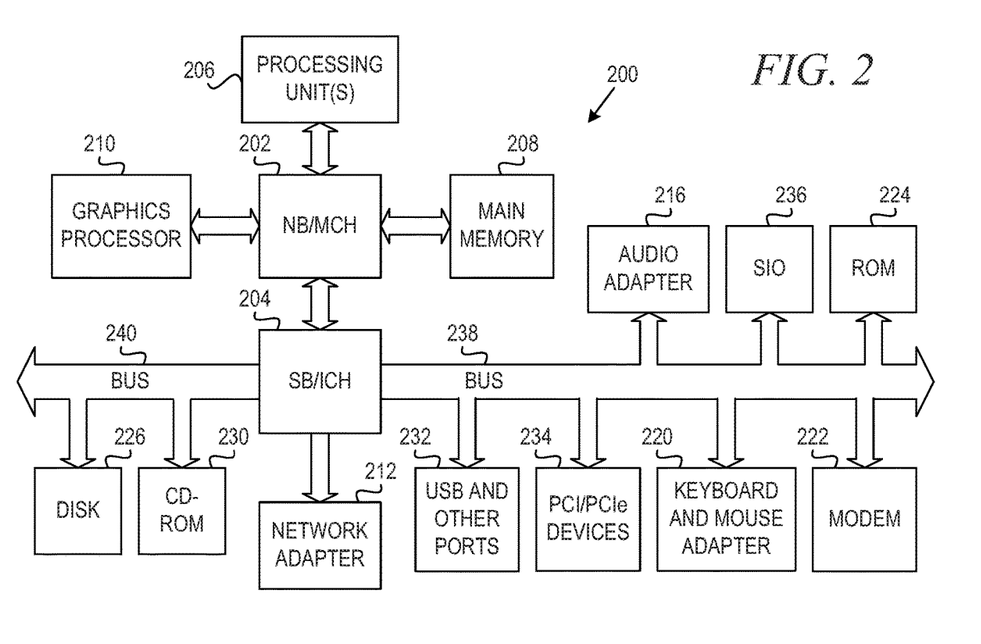
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a schematic diagram of one illustrative embodiment of a cognitive system 100 implementing a request processing pipeline 108 in a computer network 102. The cognitive system 100 is implemented on one or more computing devices 104A-C (comprising one or more processors and one or more memories, and potentially any other computing device elements generally known in the art including buses, storage devices, communication interfaces, and the like) connected to the computer network 102. For purposes of illustration only, FIG. 1 depicts the cognitive system 100 being implemented on computing device 104A only, but as noted above the cognitive system 100 may be distributed across multiple computing devices, such as a plurality of computing devices 104A-C. The network 102 includes multiple computing devices 104A-C, which may operate as server computing devices, and 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 may provide cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 100 may be used with components, systems, sub-systems, and/or devices other than those that are depicted herein.

The cognitive system 100 is configured to implement a request processing pipeline 108 that receive inputs from various sources. The requests may be posed in the form of a natural language request, natural language request for information, natural language request for the performance of a cognitive operation, or the like. For example, the cognitive system 100 receives input from the network 102, a corpus or corpora of electronic documents 106, cognitive system users, and/or other data and other possible sources of input. In one embodiment, some or all of the inputs to the cognitive system 100 are routed through the network 102. The various computing devices 104A-C on the network 102 include access points for content creators and cognitive system users. Some of the computing devices 104A-C include devices for a database storing the corpus or corpora of data 106 (which is shown as a separate entity in FIG. 1 for illustrative purposes only). Portions of the corpus or corpora of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus or corpora of data 106 for use as part of a corpus of data with the cognitive system 100. The document includes any file, text, article, or source of data for use in the cognitive system 100. Cognitive system users access the cognitive system 100 via a network connection or an Internet connection to the network 102, and input requests to the cognitive system 100 that are processed based on the content in the corpus or corpora of data 106. In one embodiment, the requests are formed using natural language. The cognitive system 100 parses and interprets the request via a pipeline 108, and provides a response to the cognitive system user, e.g., cognitive system user 110, containing one or more response to the request, results of processing the request, or the like. In some embodiments, the cognitive system 100 provides a response to users in a ranked list of candidate responses while in other illustrative embodiments, the cognitive system 100 provides a single final response or a combination of a final response and ranked listing of other candidate responses.

The cognitive system 100 implements the pipeline 108 which comprises a plurality of stages for processing an input request based on information obtained from the corpus or corpora of data 106. The pipeline 108 generates responses for the input request based on the processing of the input request and the corpus or corpora of data 106.

As noted above, while the input to the cognitive system 100 from a client device may be posed in the form of a natural language request, the illustrative embodiments are not limited to such. Rather, the input request may in fact be formatted or structured as any suitable type of request which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis. In the case of a healthcare based cognitive system, this analysis may involve processing patient medical records, medical guidance documentation from one or more corpora, and the like, to provide a healthcare oriented cognitive system result.

In the context of the present invention, cognitive system 100 may provide a cognitive functionality for assisting with healthcare based operations. For example, depending upon the particular implementation, the healthcare based operations may comprise patient diagnostics medical practice management systems, personal patient care plan generation and monitoring, or patient electronic medical record (EMR) evaluation for various purposes. Thus, the cognitive system 100 may be a healthcare cognitive system 100 that operates in the medical or healthcare type domains and which may process requests for such healthcare operations via the request processing pipeline 108 input as either structured or unstructured requests, natural language input, or the like.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a data preparation engine 120 that performs statistical analysis on an existing data set for an enterprise to generate one or more statistical distributions of the cases and features correlated with an operation for which cognitive system 100 is to be trained. The particular features looked for may be subject matter expert (SME) supplied or may be learned through machine learning. Data preparation engine 120 performs a diversity based analysis on the statistical distribution to select a subset of entries in the data set, e.g., cases that have features that would represent all possible combinations of the features in correlation with the desired determination. This subset of entries is then identified for annotation, and the annotated entries are used as a training data set for the cognitive system 100. The annotation may be performed via a template population based approach with corresponding annotation metadata.

Apart from statistical distribution, the mechanisms of the illustrative embodiments perform analysis of historical institutional knowledge of an enterprise for application of other known techniques (e.g., active learning) to capture the distribution from a context or semantic diversity perspective.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

As noted above, the mechanisms of the illustrative embodiments utilize specifically configured computing devices, or data processing systems, to perform the operations for data preparation for deep learning model training. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to data preparation.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

The illustrative embodiments provide a mechanism to select a subset of enterprise data that may be annotated for use with a cognitive system to train the cognitive system for achieving the purposes of the enterprise. The selection performs analysis of a statistical distribution to generate a recommendation on exclusion of the scenarios where cognitive modeling might be inaccurate due to scarcity of data (from frequency and semantic diversity perspective). This selection utilizes a diversity based selection of portions of training data based on a statistical distribution of the data set where the diversity based selection over-samples portions of data at tail ends of the distribution (minor classifications) while under-sampling portions of data that are more prominently represented in the distribution (base classifications). Once the subset of enterprise data is selected, the data may be converted to an annotated data set usable for training and/or testing of a cognitive system by utilizing a transcription service and templates with corresponding metadata.

Figure 3:
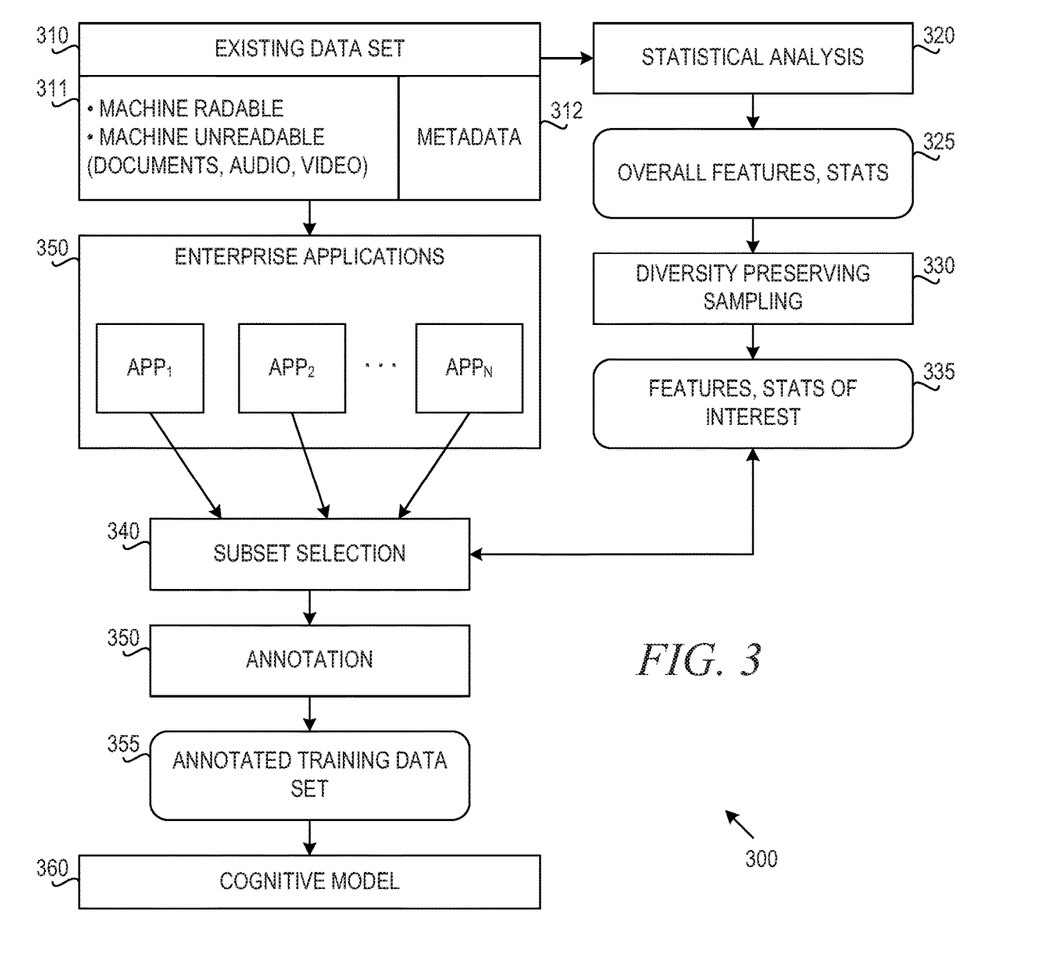
FIG. 3 is a block diagram illustrating data preparation engine for deep learning model training in accordance with an illustrative embodiment.

FIG. 3 is a block diagram illustrating data preparation engine for deep learning model training in accordance with an illustrative embodiment. An existing data set 310 includes data 311 (e.g., machine readable and machine unreadable documents, audio, video, etc.) and metadata 312. Statistical analysis component 320 performs statistical analysis to identify overall features and statistics 325.

Diversity preserving sampling component 330 then identifies features and stats of interest 335 based on the overall features and statistics 325. Subset selection component 340 then utilizes diversity based selection of portions of training data from enterprise applications 350 based on the statistical distribution of the data set where the diversity based selection over-samples portions of the data at tail ends of the distribution (minor classification) while under-sampling portions of data that are more prominently represented in the distribution (base classification).

Once the subset of enterprise data is selected, annotation component 350 converts the subset of the data set to an annotated data set 355 usable for training and/or testing cognitive model 360. In one embodiment, annotation component 350 utilizes a transcription service and templates with corresponding metadata.

Figure 4:
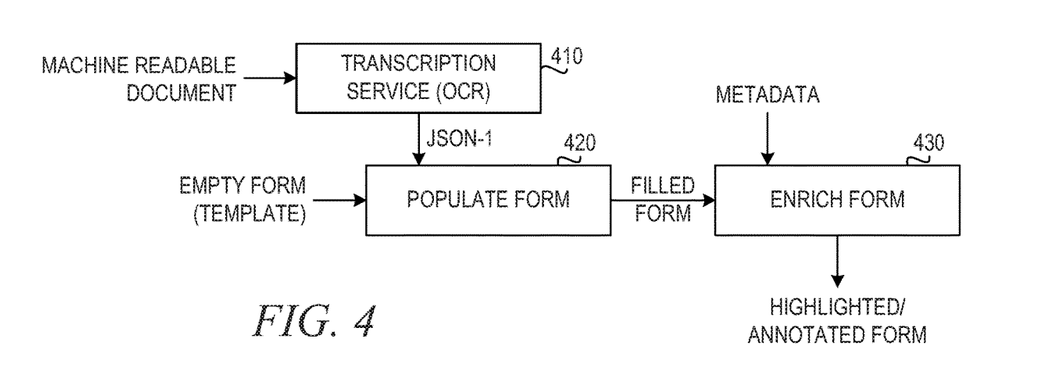
FIG. 4 is a block diagram illustrating a transcription service for translating enterprise data to annotated data for use with cognitive systems in accordance with an illustrative embodiment.

FIG. 4 is a block diagram illustrating a transcription service for translating enterprise data to annotated data for use with cognitive systems in accordance with an illustrative embodiment. A machine readable document is received by transcription service 410, which performs transcription of the document, such as optical character recognition (OCR) and other operations. Transcription service 410 generates output in JavaScript Object Notation (JSON) format. In computing, JSON is an open-standard file format that uses human-readable text to transmit data objects consisting of attribute-value pairs and array data types (or any other serializable value).

A form population component 420 receives output of the transcription service 410 and an empty form or template and generates a filled form based on results of transcribing the document. An enrich form component 430 then adds metadata to the filled form to generate a highlighted/annotated form.

As an example, consider a case where an enterprise has 168,000 patient cases, but only 500 of these are annotated with metadata. Moreover, assume that a SME or machine learning mechanism has determined that the main features that should be looked for in identifying cases that could be used for training a cognitive system for a desired operation includes the particular drug, adverse events, and whether the adverse event is expected or not. The enterprise data set is analyzed to identify instances of these features and a statistical representation of the dataset with regard to these features and corresponding attributes of these features may be generated. For each of these features, where there is a variation, the mechanisms of the illustrative embodiments determine statistical measures to identify those cases of interest based on an identification of attributes of interest from the statistical representation, e.g., 70 cases are serious, 20 cases are life threatening. The mechanisms identify a minimum set of 20K cases that have a representation of all possible combination of the 50 attributes of interest.

Essentially this informs a client that if they annotate these 20K cases, rather than the 168K cases, these 20K cases may be used for training/testing a cognitive system to perform the operation that they requested. Alternatively, these 20K cases may be run through a translation service that will translate these 20K cases into a format that is annotated and usable for training/testing a cognitive system, as shown in FIG. 4. That is, after the mechanisms of the illustrative embodiments have identified the subset of cases, they can digitize the machine unreadable documents, utilizing template population, and enrich the template form with metadata to generate an annotated form.

Figure 5:
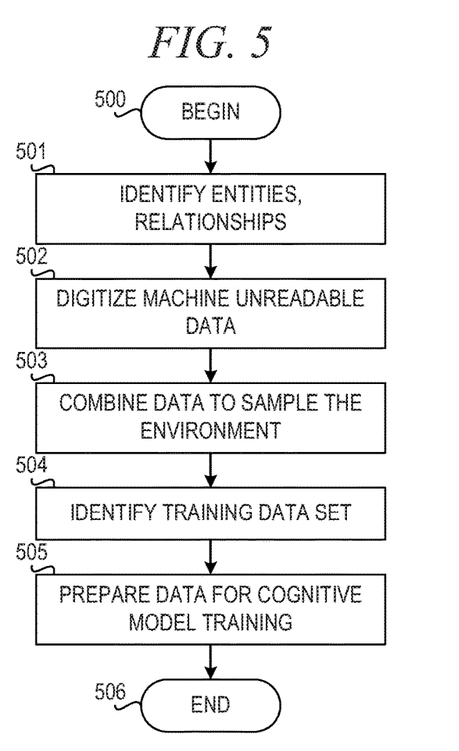
FIG. 5 is a flowchart illustrating operation of an engine for cognitive data preparation for deep learning model training in accordance with an illustrative embodiment.

FIG. 5 is a flowchart illustrating operation of an engine for cognitive data preparation for deep learning model training in accordance with an illustrative embodiment. Operation begins (block 500), and the engine identifies entities and relationships in the enterprise data set (block 501). The engine digitizes machine unreadable data (block 502). The engine then combines data to sample the environment (block 503). Then, the engine identifies the training data set (block 504). The engine prepares the data for cognitive model training (block 505). Thereafter, operation ends (block 506).

Figure 6:
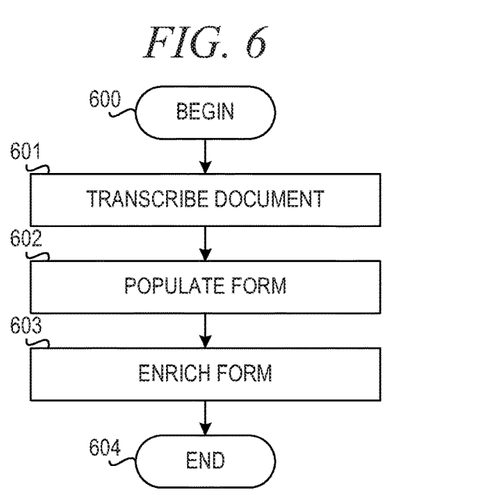
FIG. 6 is a flowchart illustrating operation of a mechanism for translation of enterprise data to annotated data for use with cognitive systems in accordance with an illustrative embodiment.

FIG. 6 is a flowchart illustrating operation of a mechanism for translation of enterprise data to annotated data for use with cognitive systems in accordance with an illustrative embodiment. Operation begins (block 600), and the mechanism transcribes the document, e.g., using optical character recognition (OCR) (block 601). The mechanism populates a form or template using data from the transcribed document (block 602). The mechanism then enriches the form using metadata (block 603). Thereafter, operation ends (block 604).

Because cognitive training data acquisition is a resource intensive process and the historical data might not be available in a rich, digital, and annotation- and labelling-friendly format, a pipeline can be composed using existing techniques, such as OCR, correlation of data with metadata to digitally re-create/transcribe a rich data format that can be annotated/labeled from the re-creation step itself.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions executed by the at least one processor to cause the at least one processor to train a computer implemented machine learning model, the method comprising:

determining a target operation for which the computer implemented model is to be trained;

performing a statistical analysis of an enterprise dataset for an enterprise to generate one or more statistical distributions of cases and features correlated with the operation for which the computer implemented model is to be trained, wherein the cases are patient cases and the features comprise a drug feature, an adverse event feature, and an adverse event expectedness feature;

selecting a subset of cases in the enterprise dataset for annotation based on at least one attribute of the one or more statistical distributions of cases and features at least by executing an oversampling operation for sampling portions of the one or more statistical distributions that are present at tail ends of the one or more statistical distributions, and executing an under-sampling operation for sampling portions of the one or more statistical distributions that are relatively prominently represented in the one or more statistical distributions, to thereby generate the selected subset of cases and features;

annotating the selected subset of cases to generate an annotated training dataset at least by executing a transcription operation by a transcription service on documents of the selected subset of cases and populating templates with corresponding metadata based on results of the transcription operation; and     executing a machine learning training operation on the computer implemented machine learning model, at least by executing the computer implemented machine learning model on the annotated training dataset, to train the computer implemented model to perform the target operation.

2. The method of claim 1, wherein the computer implemented model is an instance of a cognitive computing system.

3. The method of claim 1, wherein selecting the subset of cases in the enterprise dataset for annotation comprises performing an analysis on the one or more statistical distributions to generate a recommendation on exclusion of scenarios where cognitive modeling might be inaccurate due to scarcity of data from frequency and semantic diversity perspective.

4. The method of claim 1, wherein selecting the subset of cases comprises performing a diversity based selection of portions of the training data based on the one or more statistical distributions to select cases that represent all possible combinations of features in correlation with the operation.

5. The method of claim 1, wherein performing the statistical analysis of the enterprise dataset comprises performing analysis of historical institutional knowledge of the enterprise for application of other known techniques to capture a distribution from a context of semantic diversity perspective.

6. The method of claim 1, wherein the annotated training dataset has a smaller size than the enterprise dataset.

7. The method of claim 1, wherein the at least one attribute comprises a seriousness attribute for an adverse event.

8. The method of claim 1, wherein annotating the selected subset of cases to generate an annotated training dataset is performed automatically without human intervention.

9. The method of claim 1, wherein the transcription operation comprises a optical character reading (OCR) operation that converts a document into a machine readable transcribed document, and wherein populating the template comprises populating the template with data from the machine readable transcribed document and enriching the populated template with annotation metadata.

10. A computer program product comprising a computer readable storage medium having a computer readable program stored therein, wherein the computer readable program, when executed on a computing device, causes the computing device to train a computer implemented machine learning model, wherein the computer readable program causes the computing device to:

determine a target operation for which the computer implemented model is to be trained;

perform a statistical analysis of an enterprise dataset for an enterprise to generate one or more statistical distributions of cases and features correlated with the operation for which the computer implemented model is to be trained, wherein the cases are patient cases and the features comprise a drug feature, an adverse event feature, and an adverse event expectedness feature;

select a subset of cases in the enterprise dataset for annotation based on at least one attribute of the one or more statistical distributions of cases and features at least by executing an oversampling operation for sampling portions of the one or more statistical distributions that are present at tail ends of the one or more statistical distributions, and executing an under-sampling operation for sampling portions of the one or more statistical distributions that are relatively prominently represented in the one or more statistical distributions, to thereby generate the selected subset of cases and features;

annotate the selected subset of cases to generate an annotated training dataset at least by executing a transcription operation by a transcription service on documents of the selected subset of cases and populating templates with corresponding metadata based on results of the transcription operation; and     execute a machine learning training operation on the computer implemented machine learning model, at least by executing the computer implemented machine learning model on the annotated training dataset, to train the computer implemented model to perform the target operation.

11. The computer program product of claim 10, wherein the computer implemented model is an instance of a cognitive computing system.

12. The computer program product of claim 10, wherein selecting the subset of cases comprises performing a diversity based selection of portions of the training data based on the one or more statistical distributions to select cases that represent all possible combinations of features in correlation with the operation.

13. The computer program product of claim 10, wherein the annotated training dataset has a smaller size than the enterprise dataset.

14. The computer program product of claim 10, wherein the at least one attribute comprises a seriousness attribute for an adverse event.

15. The computer program product of claim 10, wherein annotating the selected subset of cases to generate an annotated training dataset is performed automatically without human intervention.

16. The computer program product of claim 10, wherein the transcription operation comprises an optical character reading (OCR) operation that converts a document into a machine readable transcribed document, and wherein populating the template comprises populating the template with data from the machine readable transcribed document and enriching the populated template with annotation metadata.

17. An apparatus comprising:
a processor; and
a memory coupled to the processor, wherein the memory comprises instructions which, when executed by the processor, cause the processor to train a computer implemented machine learning model, wherein the instructions cause the processor to:
determine a target operation for which the computer implemented model is to be trained;
perform a statistical analysis of an enterprise dataset for an enterprise to generate one or more statistical distributions of cases and features correlated with the operation for which the computer implemented model is to be trained, wherein the cases are patient cases and the features comprise a drug feature, an adverse event feature, and an adverse event expectedness feature;
select a subset of cases in the enterprise dataset for annotation based on at least one attribute of the one or more statistical distributions of cases and features at least by executing an oversampling operation for sampling portions of the one or more statistical distributions that are present at tail ends of the one or more statistical distributions, and executing an under-sampling operation for sampling portions of the one or more statistical distributions that are relatively prominently represented in the one or more statistical distributions, to thereby generate the selected subset of cases and features;
annotate the selected subset of cases to generate an annotated training dataset at least by executing a transcription operation by a transcription service on documents of the selected subset of cases and populating templates with corresponding metadata based on results of the transcription operation; and
execute a machine learning training operation on the computer implemented machine learning model, at least by executing the computer implemented machine learning model on the annotated training dataset, to train the computer implemented model to perform the target operation.

18. The apparatus of claim 17, wherein the computer implemented model is an instance of a cognitive computing system.

19. The apparatus of claim 17, wherein selecting the subset of cases comprises performing a diversity based selection of portions of the training data based on the one or more statistical distributions to select cases that represent all possible combinations of features in correlation with the operation.

* * * * *